Patented Sept. 29, 1953

2,653,868

UNITED STATES PATENT OFFICE 2,653,868

RECOVERY OF METALS FROM METALLURGICAL SLAG

Lyall J. Lichty, Ottawa, Ontario, Canada, assignor to Northfield Mines, Inc., New York, N. Y., a corporation of Delaware No Drawing. Application October 30, 1950, Serial No. 193,032

7 Claims. (Cl. 75—24)

This invention relates to a method for treating metallurgical slags, such as nickel or copper converter slags to recover the non-ferrous metals, such as copper, nickel and cobalt, and/or to recover separately the iron therein.

It is common practice to smelt a copper or nickel ore or concentrate to form a matte which is essentially copper or nickel sulfide and iron sulfide. In general, these mattes contain from about 30 to 45 per cent copper or nickel.

These mattes then are subjected to a converting operation to remove sulfur and iron. In converting copper matte, the iron sulfide is eliminated by oxidation and the iron passes into the silicate slag. The oxidation then is continued to remove the sulfur from the copper sulfide, leaving metallic copper. The nickel converting operation is similar but differs essentially in that the converting operation is stopped when the iron sulfide has been eliminated, leaving nickel sulfide.

The slag from copper and nickel converters is high in iron content and contains substantial amounts of copper and nickel respectively. These slags usually are resmelted by adding them to the charge in the smelters. The composition of these slags is similar. Typical copper converter slag contains 45 to 55 per cent iron, 18 to 30 per cent silica and 2 to 5 per cent copper. The nickel converter slag usually contains slightly less iron and a nickel content considerably less than the copper content of the copper converter slag. The copper converter slag may contain some nickel and the nickel converter slag often contains a small amount of copper or cobalt or both.

The present invention provides a method for producing from such slags a matte containing substantially all the copper, nickel and cobalt present in the slag and only a small proportion of the iron, a secondary slag being produced simultaneously from which iron can be recovered. The matte produced by treating copper converter slag in accordance with the present invention is, in many instances, sufficiently high in copper content to be delivered direct to the converter. When the matte produced is of lower grade, it may be added to the smelter charge. Thus, the desired non-ferrous metal may be recovered from converter slag either by directly converting a high grade matte separated from the converter slag or by adding to the smelter charge a small fractional part of such slag in the form of separated matte.

The invention is based upon the discovery that when a reducing agent which is essentially silicon is incorporated in a converter slag and the slag is brought to a molten state substantially all the copper, nickel or cobalt present and a small proportion only of the iron present is precipitated as matte when the amount of reducing agent used is only about one half of that theoretically required to precipitate all the iron present in the slag. It was discovered further that as the deficiency of reducing agent is gradually increased to about 80 per cent the grade of matte precipitated becomes gradually higher without substantial decrease in the percentage recovery of such non-ferrous metals. As the deficiency of reducing agent is further gradually increased up to slightly more than 90 per cent, there is a rapid increase in the grade of matte produced, that is, when the amount of reducing agent used is not more than about 20 per cent of the amount theoretically required to precipitate all the iron in the slag. Thus, in treating 50 pound batches of a nickel converter slag containing 31.42% $SiO_2$, 48.09% FeO, 8.80% $Al_2O_3$, 3.93% CaO, 0.11% copper, 0.17% nickel and 0.11% cobalt with 3.5 pounds, 1.5 pounds and 0.5 pounds of a reducing agent containing 66.5% silicon, 8% aluminum and 25% iron, I have obtained 10.5 pounds, 5 pounds and 2 pounds of matte respectively containing (1) 0.90% nickel, 0.44% copper and 5.8% sulfur; (2) 1.6% nickel, 0.7% copper, 0.98% cobalt and 7.0% sulfur; and (3) 3.74% nickel, 1.53% copper, 1.66% cobalt and 12.01% sulfur. Thus, the invention contemplates treatment of a slag the major components of which are silica and iron oxide and which contains very small amounts of a metal selected from the group consisting of copper, nickel and cobalt and mixtures thereof. While the amount of reducing agent used is not less than 10 per cent of the amount theoretically required to precipitate all the iron present in the slag, the minimum amount of reducing agent used as above illustrated is substantially greater than that theoretically required to reduce to metal all the copper, nickel or cobalt if these metals are present as oxides or silicates.

In the practice of the present invention a copper or nickel converter slag is brought to a molten condition and a reducing agent, such as ferrosilicon or an alloy of silicon, aluminum and iron, known as alsifer, is introduced in amount not greater than about 50 per cent of the amount of silicon or silicon and aluminum theoretically required to precipitate all the iron in the slag whereby a matte is precipitated containing substantially all the copper, nickel and cobalt present in the slag. By permitting the molten mixture to settle the matte can be separated from the secondary slag which is substantially free of copper, nickel and cobalt. This secondary slag may be mixed with a suitable amount of lime and brought to a molten state and a reducing agent, such as ferro-silicon, alsifer or calcium carbide, introduced to precipitate an iron product similar to cast iron or steel.

In producing the matte from copper or nickel converter slag, the reducing agent used should be in a finely divided condition and, preferably, the particle size should not be greater than about 65 mesh. The molten mixture should be heated to a temperature sufficiently high, such as between 1200° C. to 1500° C., to provide a fluid, non-sticky secondary slag at the time the mixture is permitted to settle.

In precipitating iron from the secondary slag a similar high temperature is employed. The amount of lime added should be sufficient to replace the ferrous oxide removed in the form of iron. In place of the reducing agents mentioned, other reducing agents effective to reduce ferrous oxide to metal may be used.

The procedure employed in a given instance in the practice of the invention depends upon the result desired. If a high grade matte is precipitated from a copper or nickel converter slag, the sulfur content of the secondary slag usually is higher and, consequently, the sulfur content of the iron precipitated from the secondary slag is higher. Therefore, if the primary object is to recover iron free from copper, nickel and cobalt, it is preferable to precipitate a low grade matte from the converter slag to provide a secondary slag low in sulfur to reduce the amount of sulfur which must be removed from the iron by subsequent processing. In such case I prefer to employ the reducing agent in deficiency of about 50 per cent. When a higher grade matte is desired I employ substantially less reducing agent, the percentage deficiency depending upon the amount of copper, nickel or cobalt in the slag and to a lesser extent upon the amount of iron in the slag. Thus, in the case of a slag containing less than 2 per cent of copper, nickel or cobalt, the deficiency usually is greater than about 80 per cent if it is desired to obtain a higher grade matte. If the content of copper, nickel or cobalt of the slag is as high as 5 per cent the desired grade of matte may be obtained using a deficiency of reducing agent of about 65 per cent, that is, not greater than about 35 per cent of the amount theoretically required to precipitate all the iron present in the slag.

The invention is illustrated further by the following specific example:

Two 1½ inch diameter graphite electrodes were placed in a 50 pound Lectromelt furnace. Fifty pounds of nickel converter slag of the composition given hereinbefore was crushed to about 10 mesh. Thirty-five pounds was thoroughly mixed with 0.5 pound of alsifer having a particle size of about 65 mesh and having the composition given hereinbefore. The furnace was heated on dead short for 55 minutes and then the remaining 15 pounds of slag was gradually charged into the furnace to provide a hot bath. The mixture of slag and alsifer then was gradually added to the hot bath over a period of 60 minutes. The average power readings were 24 kw. and 480 amps. After ten minutes additional heating, the charge was poured into a cast iron pot. The precipitated matte settled in the bottom of the pot and after cooling was easily removed from the secondary slag. The matte recovered weighed two pounds and contained 3.74% nickel, 1.53% copper, 1.66% cobalt and 12.01% sulfur.

The secondary slag was crushed to about 10 mesh and 30 pounds was mixed with 3.5 pounds of alsifer of the above mentioned particle size and composition together with 6 pounds of lime. The previously mentioned furnace was heated on dead short for 55 minutes. The mixture of slag, alsifer and lime then was gradually charged into the furnace over a period of 35 minutes. The average power readings were 24 kw. and 480 amps. After 5 minutes additional heating, the charge was poured into a cast iron pot. The metal recovered weighed 8.75 pounds and contained 0.66% carbon, 2.01% sulfur, 0.089% phosphorus, 1.09% silicon and only traces of nickel and copper, and the remainder essentially iron.

I claim:

1. The method of treating a metallurgical slag having as components a small amount of a metal selected from the group consisting of copper, nickel, cobalt and mixtures thereof and a substantially larger amount of iron and silica together with sulfur, said method consisting of bringing the slag to a molten state, introducing into said slag a reducing agent selected from the group consisting of ferrosilicon and an alloy of aluminum, iron and silicon in an amount not less than 10 per cent and not greater than 50 per cent of the amount theoretically required to precipitate all the iron in the slag thereby precipitating substantially all of said metal together with iron and some sulfur as matte, and thereafter permitting the precipitated matte to settle in a separate layer, the amount of said reducing agent used being substantially greater than that theoretically required to reduce to metal all of the metal of said group if present as oxide or silicate.

2. The method as described by claim 1 in which said reducing agent is an alloy of silicon, aluminum and iron and in which said slag is a nickel converter slag containing about 31.42 per cent $SiO_2$, 48.09 per cent FeO, 8.80 per cent $Al_2O_3$, 3.93 per cent CaO, 0.11 per cent copper, 0.17 per cent nickel and 0.11 per cent cobalt.

3. The method as described by claim 1 in which the amount of said reducing agent is not greater than about 35 per cent of the amount theoretically required to precipitate all the iron in the slag.

4. The method as described by claim 1 in which the amount of said reducing agent is not greater than about 20 per cent of the amount theoretically required to precipitate all the iron in the slag.

5. The method as described by claim 1 in which the reducing agent is an alloy of silicon, aluminum and iron.

6. The method as described by claim 3 in which the reducing agent is an alloy of silicon, aluminum and iron.

7. The method as described by claim 4 in which the reducing agent is an alloy of silicon, aluminum and iron.

LYALL J. LICHTY.

References Cited in the file of this patent

UNITED STATES PATENTS

| Number | Name | Date |
|---|---|---|
| 905,280 | Betts | Dec. 1, 1908 |
| 905,281 | Betts | Dec. 1, 1908 |
| 1,319,061 | Garred | Oct. 21, 1919 |
| 1,544,048 | Stout | June 30, 1925 |
| 1,920,377 | Greene | Aug. 1, 1933 |
| 2,395,029 | Baily | Feb. 19, 1946 |
| 2,438,911 | Gronningsaeter | Apr. 6, 1948 |
| 2,471,562 | Fittener | May 31, 1949 |

FOREIGN PATENTS

| Number | Country | Date |
|---|---|---|
| 15,107 | Australia | Nov. 15, 1934 |